United States Patent
Chalin

(10) Patent No.: US 6,871,862 B2
(45) Date of Patent: Mar. 29, 2005

(54) LIFT AXLE SUSPENSION SYSTEM

(75) Inventor: Thomas N. Chalin, Fairview, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 102 days.

(21) Appl. No.: 10/247,912

(22) Filed: Sep. 20, 2002

(65) Prior Publication Data

US 2004/0056441 A1 Mar. 25, 2004

(51) Int. Cl.[7] ............................................. B62D 61/12
(52) U.S. Cl. ............................ 280/86.5; 280/124.157; 280/124.128
(58) Field of Search .................. 280/124.128, 124.157, 280/86.5, FOR 161, 124.116

(56) References Cited

U.S. PATENT DOCUMENTS

| | | | |
|---|---|---|---|
| 3,912,293 A | | 10/1975 | Harbers |
| 4,261,597 A | * | 4/1981 | Vandenberg ............. 280/86.75 |
| 4,300,787 A | | 11/1981 | Vandenberg |
| 4,504,080 A | | 3/1985 | Vandenberg |
| 4,573,704 A | | 3/1986 | Vandenberg et al. |
| 4,684,142 A | | 8/1987 | Christenson |
| 4,763,953 A | | 8/1988 | Chalin |
| 4,773,670 A | * | 9/1988 | Raidel, II .................. 280/86.5 |
| 4,783,096 A | | 11/1988 | Ramsey et al. |
| 4,848,783 A | | 7/1989 | Christenson et al. |
| 4,881,747 A | * | 11/1989 | Raidel ........................ 280/81.6 |
| 5,015,004 A | * | 5/1991 | Mitchell ..................... 280/81.6 |
| 5,018,755 A | | 5/1991 | McNeilus et al. |
| 5,018,756 A | * | 5/1991 | Mitchell ..................... 280/81.6 |
| 5,090,495 A | | 2/1992 | Christenson |
| 5,230,528 A | * | 7/1993 | Van Raden et al. ......... 280/86.5 |
| 5,435,592 A | * | 7/1995 | Aamodt ............... 280/124.116 |
| 5,505,481 A | | 4/1996 | Vandenberg et al. |
| 5,505,482 A | | 4/1996 | Vandenberg |
| 5,540,454 A | | 7/1996 | Vandenberg et al. |
| 5,597,174 A | | 1/1997 | Christenson et al. |
| 5,746,441 A | | 5/1998 | Vandenberg |
| 5,778,798 A | | 7/1998 | Vandenberg |
| 5,791,681 A | | 8/1998 | Vandenberg |
| 5,823,629 A | | 10/1998 | Smith et al. |
| 5,853,183 A | | 12/1998 | Vandenberg |
| 5,865,452 A | * | 2/1999 | Chalin ................. 280/124.125 |
| 5,868,418 A | | 2/1999 | Vandenberg |
| 5,897,123 A | | 4/1999 | Cherney et al. |
| 5,908,198 A | | 6/1999 | Vandenberg |
| 5,915,705 A | | 6/1999 | Vandenberg |
| 5,944,339 A | | 8/1999 | McKenzie et al. |
| 6,073,946 A | | 6/2000 | Richardson |
| 6,116,698 A | | 9/2000 | Smith et al. |
| 6,123,347 A | | 9/2000 | Christenson |

OTHER PUBLICATIONS

Oshkosh Truck Corporation Brochure, dated Nov., 1998.
Silent Drive "Maxle–Ize" Flyer, undated.
Reyco Granning "Maximiser Series Model L132" Flyer, undated.
Silent Drive "AAS–727 Lite" Web Page, printed May 14, 2002.
Silent Drive "AAS–721" Web Page, printed May 14, 2002.

* cited by examiner

Primary Examiner—Ruth Ilan
(74) Attorney, Agent, or Firm—Konneker & Smith, P.C.

(57) ABSTRACT

A lift axle suspension system. In a described embodiment, a lift axle suspension system includes: an axle assembly; an air spring connected between the axle assembly and a bracket attached to a vehicle frame; a trailing arm attached to the axle assembly; and a lift air spring. The lift air spring is connected between the bracket and the trailing arm, so that the axle assembly is lifted when the lift air spring is extended.

25 Claims, 2 Drawing Sheets

LIFT AXLE SUSPENSION SYSTEM

BACKGROUND

The present invention relates generally to suspension systems for wheeled vehicles and, in an embodiment described herein, more particularly provides a steerable lift axle suspension system.

Those skilled in the art of vehicle suspension system design and manufacture know that it is becoming increasingly important to provide suspension systems which have reduced weight, and which are more compact. These objectives are sought for all types of suspension systems, including steerable lift axle suspension systems. However, these objectives are particularly difficult to achieve in steerable suspension systems, due to the fact that so many functions are performed by these suspension systems.

For example, a typical liftable steerable suspension system must perform the functions of lifting an axle assembly relative to a vehicle frame, allowing the tires to steer, carrying loads and providing an acceptable ride quality. These last functions are many times satisfied by using a parallelogram-type arrangement of trailing arms pivotably connected between a hanger bracket and the axle assembly. It will be readily appreciated that, with all of the equipment needed to perform all of these functions, decreasing weight and increasing compactness are difficult goals to accomplish.

Therefore, it can be seen that it would be quite desirable to provide a steerable lift axle suspension system which solves the above problems in the art. The concepts used to solve these problems could also be applied to other types of suspension systems, including other liftable suspension systems.

SUMMARY

In carrying out the principles of the present invention, in accordance with an embodiment thereof, a steerable lift axle suspension system is provided. In a described embodiment, a lift axle suspension system includes: an axle assembly; an air spring connected between the axle assembly and a bracket attached to a vehicle frame; a trailing arm attached to the axle assembly; and a lift air spring. The lift air spring is connected between the bracket and the trailing arm, so that the axle assembly is lifted when the lift air spring is extended.

In one aspect of the invention, a lift axle suspension system includes: a vehicle frame; an axle assembly; a trailing arm connected to the axle assembly; and a lift air spring connected between the vehicle frame and the trailing arm. Extension of the lift air spring lifts the axle assembly toward the vehicle frame.

In another aspect of the invention, a lift axle suspension system includes: an axle assembly; a hanger bracket configured for attachment to the vehicle frame, the hanger bracket having at least one trailing arm pivotably attached thereto; and a lift air spring which is operative to lift the axle assembly. The hanger bracket includes a recessed pocket formed therein. The lift air spring displaces into the hanger bracket pocket when the axle assembly is lifted.

In yet another aspect of the invention, a lift axle suspension system includes: an axle assembly; an air spring connected between the axle assembly and an air spring bracket configured for attachment to a vehicle frame; a trailing arm attached to the axle assembly; and a lift air spring. The lift air spring is connected between the air spring bracket and the trailing arm, such that the axle assembly is lifted when the lift air spring is extended.

These and other features, advantages, benefits and objects of the present invention will become apparent to one of ordinary skill in the art upon careful consideration of the detailed description of a representative embodiment of the invention hereinbelow and the accompanying drawings.

DETAILED DESCRIPTION

Figure 1:
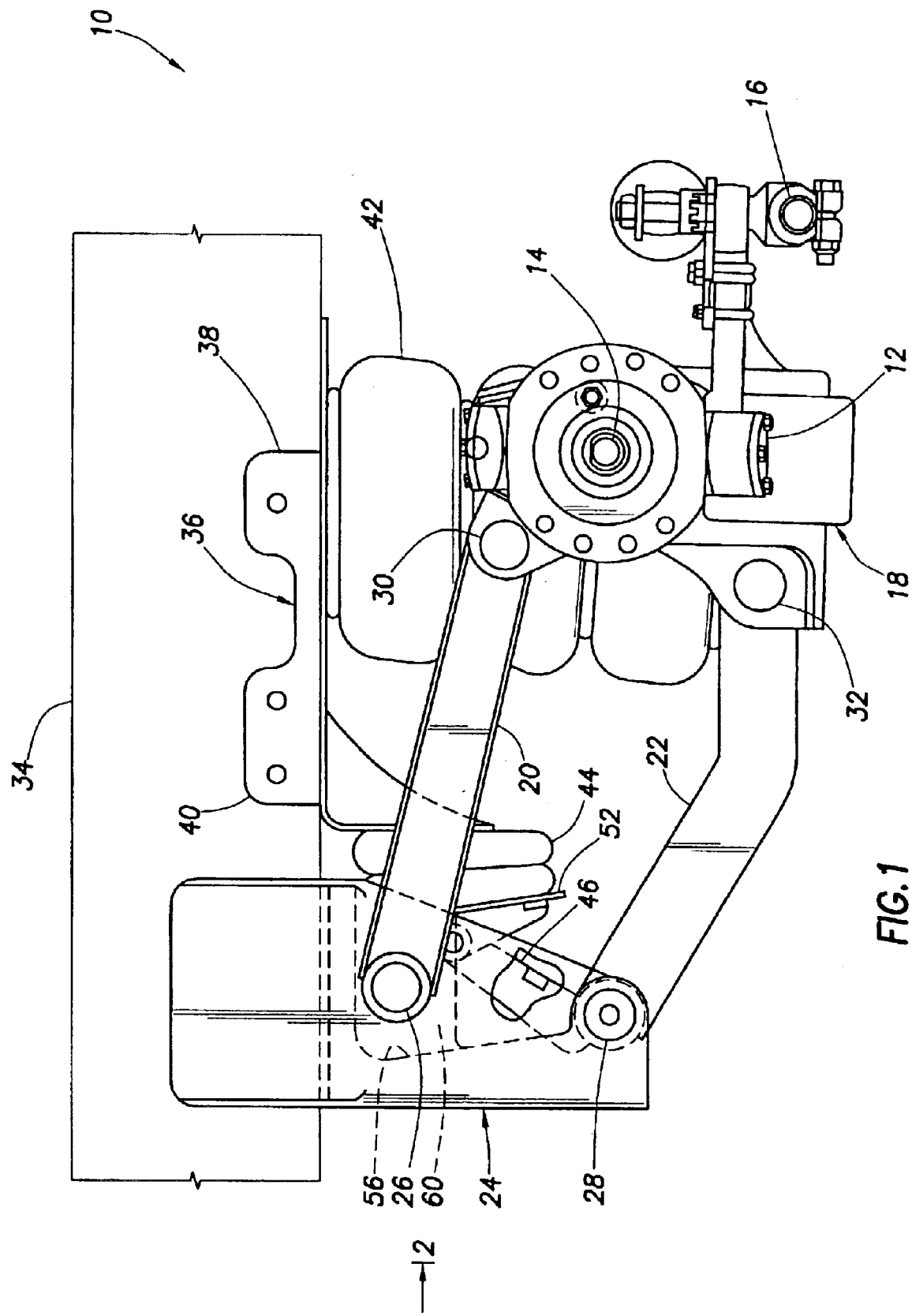
FIG. 1 is a side elevational view of a steerable lift axle suspension system embodying principles of the present invention.

Representatively illustrated in FIG. 1 is a steerable lift axle suspension system 10 which embodies principles of the present invention. In the following description of the suspension system 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

The suspension system 10 is described herein as being a steerable suspension system. For this purpose, a king pin housing 12 for pivotably mounting a spindle 14, a tie rod 16, etc., are connected at each opposite end of an axle assembly 18 of the suspension system 10. However, it should be clearly understood that it is not necessary for a suspension system incorporating principles of the invention to be a steerable suspension system.

The suspension system 10 is also described herein as being a parallelogram-type suspension system. An upper trailing arm 20 and a lower trailing arm 22 are pivotably connected between a hanger bracket 24 and the axle assembly 18 at pivots 26, 28, 30 and 32. The pivots 26, 28, 30, 32 preferably form the vertices of a parallelogram, so that the trailing arms 20, 22 remain substantially parallel to each other as the axle assembly 18 displaces upwardly and downwardly relative to a vehicle frame 34. However, it should be clearly understood that it is not necessary for a suspension system incorporating principles of the invention to be a parallelogram-type suspension system.

The hanger bracket 24 is attached to the vehicle frame 34 and extends downwardly therefrom. Another bracket 36 is also attached to the vehicle frame 34. This bracket 36 performs at least two functions, thereby enhancing the compactness of the suspension system 10, and reducing its weight.

Specifically, the bracket 36 includes an air spring bracket 38 and a lift air spring bracket 40. The air spring bracket 38 provides for connecting air spring 42 between the vehicle frame 34 and the axle assembly 18 for supporting the vehicle frame. The lift air spring bracket 40 provides for connecting a lift air spring 44 between the vehicle frame 34 and a lever arm 46 rigidly attached to the lower trailing arm 22.

However, it should be clearly understood that, instead of being integrally formed in the bracket 36, the lift air spring bracket 40 and the air spring bracket 38 could be separately formed, in keeping with the principles of the invention.

A lift air spring mounting plate 52 is pivotably connected to the lever arm 46. The lift air spring 44 itself is connected directly between the plate 52 and the lift air spring bracket 40. Of course, other lift air spring mounting configurations could be used without departing from the principles of the invention.

It will be readily appreciated by one skilled in the art that, as the lift air spring 44 is extended by, for example, applying air pressure therein, the lever arm 46 will be pivoted forward (to the left as depicted in FIG. 1) about the lower hanger bracket pivot 28. Since the lever arm 46 is rigidly attached to the lower trailing arm 22 (so that relative displacement between the lever arm and the trailing arm is prevented), the trailing arm will pivot upward about the pivot 28, thereby lifting the axle assembly 18 relative to the vehicle frame 34, the bracket 36 and the hanger bracket 24.

A feature that enhances the compactness of the suspension system 10 is that the lever arm 46 is positioned within the hanger bracket 24. Furthermore, the lift air spring 44 displaces forward into the hanger bracket 24 when it is extended to lift the axle assembly 18.

Figure 2:
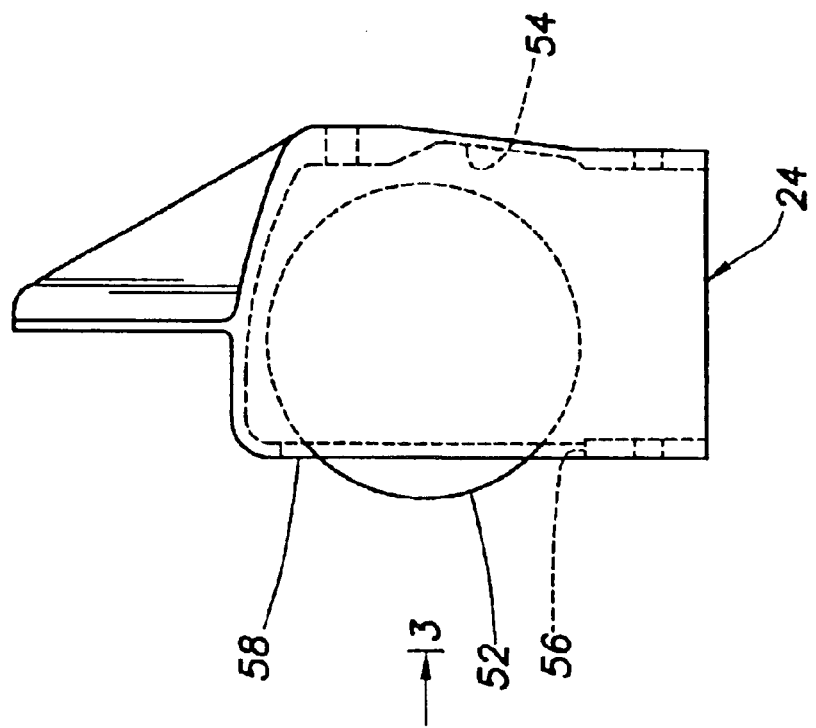
FIG. 2 is front elevational view of a hanger bracket of the suspension system of FIG. 1.

Referring additionally now to FIG. 2, a forward view of the hanger bracket 24 is representatively illustrated, taken along line 2 of FIG. 1. In this view it may be clearly seen how the lift air spring 44 is positioned relative to the hanger bracket 24, and how this positioning functions to enhance the compactness of the suspension system 10.

Note that substantially all of the lift air spring 44 and mounting plate 52 (only the mounting plate is visible in the view depicted in FIG. 2) are positioned rearwardly of an inner envelope or boundary 54 of the hanger bracket. An opening 56 cut in a side 58 of the hanger bracket permits a portion of the lift air spring 44 and mounting plate 52 to project outwardly therefrom. However, it will be readily appreciated that the hanger bracket 24 could be made somewhat wider, in which case the opening 56 would not be needed. The configuration depicted in FIG. 2 has the advantage of reducing the weight of the hanger bracket 24.

Figure 3:
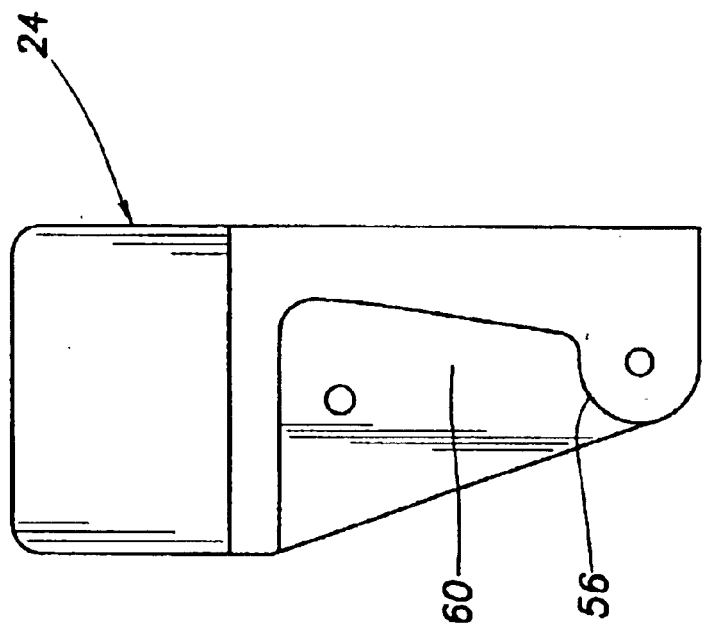
FIG. 3 is a side elevational view of the hanger bracket of FIG. 2, the side being opposite that of the view shown in FIG. 1.

Referring additionally now to FIG. 3, a side view of the hanger bracket 24 is representatively illustrated, taken along line 3 of FIG. 2. In this view it may be fully appreciated how the opening 56 is configured to form a recessed pocket 60 in the hanger bracket 24. The side 58 is illustrated in silhouette in FIG. 3, so that the pocket 60 formed by the opening 56 is highlighted.

In FIG. 1 it may be seen how this pocket 60 relates to the lift air spring 44. As the lift air spring 44 is extended, it displaces forward into the hanger bracket 24. Specifically, the lift air spring 44 is received within the pocket 60. By receiving the lift air spring 44 within the hanger bracket 24, the compactness of the suspension system 10 is enhanced.

Of course, a person skilled in the art would, upon a careful consideration of the above description of a representative embodiment of the invention, readily appreciate that many modifications, additions, substitutions, deletions, and other changes may be made to this specific embodiment, and such changes are contemplated by the principles of the present invention. For example, instead of a parallelogram-type suspension system, the lift axle suspension system could be a single trailing arm suspension system, or another type of suspension system. Accordingly, the foregoing detailed description is to be clearly understood as being given by way of illustration and example only, the spirit and scope of the present invention being limited solely by the appended claims and their equivalents.

What is claimed is:

1. A lift axle suspension system, comprising:
   an axle assembly;
   an air spring connected between the axle assembly and an air spring bracket configured for attachment to a vehicle frame;
   a trailing arm attached to the axle assembly; and
   a lift air spring connected to the trailing arm via a lever arm attached to the trailing arm,
   wherein the lift air spring is connected between the air spring bracket and the trailing arm, such that the axle assembly is lifted when the lift air spring is extended, and wherein the air spring bracket is separate from and spaced apart from a hanger bracket configured for connecting the trailing arm to the vehicle frame, the lever arm being positioned within the hanger bracket, and the trailing arm being pivotably connected to the hanger bracket.

2. The suspension system according to claim 1, wherein the lever arm is rigidly attached to the trailing arm, relative displacement being prevented between the lever arm and the trailing arm.

3. The suspension system according to claim 1, wherein the trailing arm is pivotably connected to the axle assembly.

4. The suspension system according to claim 1, wherein the trailing arm pivots relative to the hanger bracket when the lift air spring is extended.

5. The suspension system according to claim 1, wherein the trailing arm is a lower trailing arm, and further comprising an upper trailing arm, the upper and lower trailing arms remaining substantially parallel to each other as the axle assembly displaces relative to the air spring bracket.

6. A lift axle suspension system, comprising:
   an axle assembly;
   an air spring connected between the axle assembly and an air spring bracket configured for attachment to a vehicle frame;
   a trailing arm attached to the axle assembly; and
   a lift air spring connected between the air spring bracket and the trailing arm, such that the axle assembly is lifted when the lift air spring is extended,
   wherein the air spring bracket is separate from and spaced apart from a hanger bracket configured for connecting the trailing arm to the vehicle frame, the trailing arm being pivotably connected to the hanger bracket such that the trailing arm pivots relative to the hanger bracket when the lift air spring is extended, and
   wherein the hanger bracket has a recessed pocket formed therein, and the lift air spring being received within the pocket when the lift air spring is extended to lift the axle assembly.

7. The suspension system according to claim 6, wherein the lift air spring is positioned substantially external to the hanger bracket when the lift air spring is compressed to lower the axle assembly.

8. A lift axle suspension system, comprising:
   a vehicle frame;
   an axle assembly;
   a trailing arm connected to the axle assembly, the trailing arm also being connected to the vehicle frame via a hanger bracket; and
   a lift air spring connected between the vehicle frame and the trailing arm, the lift air spring being connected to the vehicle frame at a position spaced apart from the hanger bracket, wherein extension of the lift air spring lifts the axle assembly toward the vehicle frame, and wherein the trailing arm is pivotably connected to the hanger bracket attached to the vehicle frame, the hanger bracket having a recessed pocket formed therein, and the lift air spring being received within the pocket when the lift air spring is extended to lift the axle assembly.

9. The suspension system according to claim 8, wherein the lift air spring is positioned substantially external to the pocket when the lift air spring is compressed to lower the axle assembly.

10. The suspension system according to claim 8, wherein the lift air spring is connected to the vehicle frame via a lift air spring bracket.

11. The suspension system according to claim 10, further comprising an air spring connected between the vehicle frame and the axle assembly, the air spring being connected to the vehicle frame via an air spring bracket.

12. The suspension system according to claim 8, wherein the lift air spring is connected to the vehicle frame via a lift air spring bracket, wherein an air spring is connected between the vehicle frame and the axle assembly, the air spring being connected to the vehicle frame via an air spring bracket, and wherein the lift air spring bracket and the air spring bracket are integrally formed.

13. The suspension system according to claim 8, wherein the lift air spring is connected to the trailing arm via a lever arm attached to the trailing arm.

14. The suspension system according to claim 13, wherein the lever arm is rigidly attached to the trailing arm, relative displacement being prevented between the lever arm and the trailing arm.

15. The suspension system according to claim 8, wherein the trailing arm is a lower trailing arm, and further comprising an upper trailing arm, the upper and lower trailing arms remaining substantially parallel to each other as the axle assembly displaces relative to the vehicle frame.

16. A lift axle suspension system, comprising:

a vehicle frame;

an axle assembly;

a trailing arm connected to the axle assembly, the trailing arm also being connected to the vehicle frame via a hanger bracket; and a lift air spring connected between the vehicle frame and the trailing arm, the lift air spring being connected to the vehicle frame at a position spaced apart from the hanger bracket, and the lift air spring being connected to the trailing arm via a lever arm attached to the trailing arm, wherein extension of the lift air spring lifts the axle assembly toward the vehicle frame, and wherein the lever arm is positioned within the hanger bracket, the trailing arm being pivotably connected to the hanger bracket.

17. A lift axle suspension system, comprising:

an axle assembly;

a hanger bracket configured for attachment to a vehicle frame, the hanger bracket having at least one trailing arm pivotably attached thereto; and a lift air spring which is operative to lift the axle assembly by pivoting the trailing arm relative to the hanger bracket, the lift air spring being connected between the trailing arm and a second bracket configured for attachment to the vehicle frame at a position spaced apart from the hanger bracket, and the lift air spring being connected to the trailing arm via a lever arm attached to the trailing arm, wherein the level arm is positioned within the hanger bracket.

18. A lift axle suspension system, comprising:

an axle assembly;

a hanger bracket configured for attachment to a vehicle frame, the hanger bracket having at least one trailing arm pivotably attached thereto; and a lift air spring which is operative to lift the axle assembly by pivoting the trailing arm relative to the hanger bracket, the lift air spring being connected between the trailing arm and a second bracket configured for attachment to the vehicle frame at a position spaced apart from the hanger bracket, wherein the hanger bracket includes a recessed pocket formed therein, the lift air spring displacing into the hanger bracket pocket when the axle assembly is lifted.

19. The suspension system according to claim 18, wherein the lift air spring is positioned substantially external to the hanger bracket pocket when the lift air spring is compressed to lower the axle assembly.

20. The suspension system according to claim 18, wherein the suspension system is a steerable suspension system.

21. The suspension system according to claim 18, further comprising an air spring connected between the second bracket and the axle assembly.

22. The suspension system according to claim 18, wherein the lift air spring is connected to the trailing arm via a lever arm attached to the trailing arm.

23. The suspension system according to claim 22, wherein the lever arm is rigidly attached to the trailing arm, relative displacement being prevented between the lever arm and the trailing arm.

24. The suspension system according to claim 18, wherein the trailing arm is pivotably connected to the axle assembly.

25. The suspension system according to claim 18, wherein the at least one trailing arm comprises upper and lower trailing arms pivotably connected to the hanger bracket, the upper and lower trailing arms remaining substantially parallel to each other as the axle assembly displaces relative to the hanger bracket.

* * * * *